United States Patent [19]

Rasor

[11] Patent Number: 4,500,020
[45] Date of Patent: Feb. 19, 1985

[54] ARTICLE CARRIER WITH ADJUSTABLY POSITIONABLE BRACKET

[75] Inventor: William Rasor, Marysville, Mich.

[73] Assignee: Masco Corp., Taylor, Mich.

[21] Appl. No.: 375,399

[22] Filed: May 6, 1982

[51] Int. Cl.³ ............................................... B60R 9/04
[52] U.S. Cl. .................................. 224/321; 224/326; 410/104; 410/105
[58] Field of Search ............... 224/321, 324, 325, 320, 224/322, 326, 327; 410/104, 105

[56] References Cited

U.S. PATENT DOCUMENTS

| 3,554,416 | 1/1971 | Bott | 224/321 |
| 4,109,891 | 8/1978 | Grendahl | 410/105 |
| 4,245,764 | 1/1981 | Kowalski et al. | 224/321 |
| 4,278,376 | 7/1981 | Hunter | 410/104 X |
| 4,279,368 | 7/1981 | Kowalski | 224/326 |

Primary Examiner—Steven M. Pollard
Attorney, Agent, or Firm—Steven L. Permut; Leon Redman; Malcolm Sutherland

[57] ABSTRACT

An article carrier for mounting on a substantially flat exterior surface of a motor vehicle. The article carrier has two slat assemblies fixedly secured to the motor vehicle surface in a spaced apart, parallel relationship. Each slat assembly has at least one longitudinal rib. At least two pairs of brackets are provided, two brackets being removably and slidably fastened to the rib of each of the slat assemblies. A locking mechanism depending from the bracket is provided for securing the bracket in a fixed position along the slat assembly by clamping the rib between the bracket and a clamping member. One rail is supported by each pair of brackets to extend transversely therebetween above the surface.

8 Claims, 11 Drawing Figures

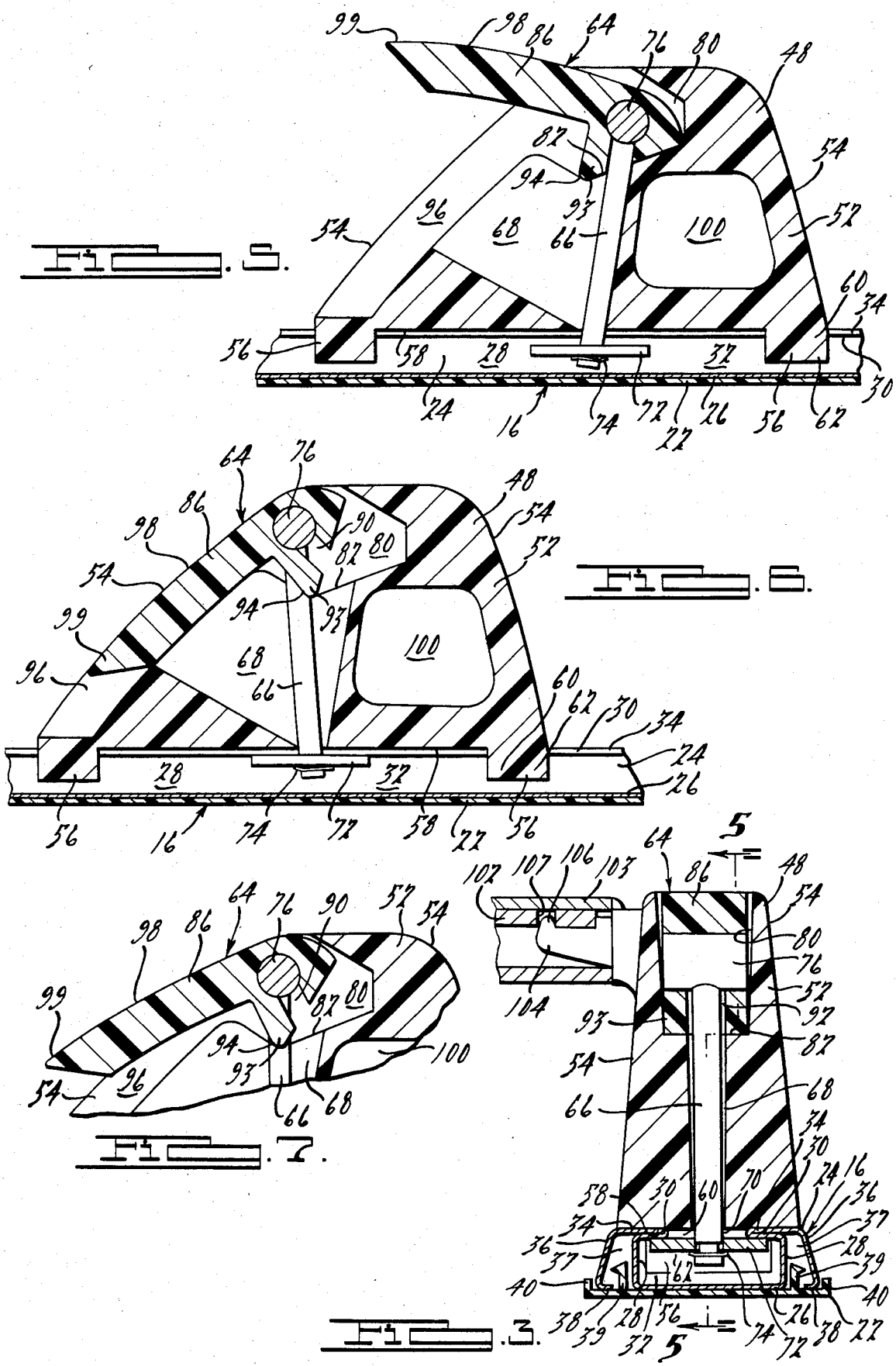

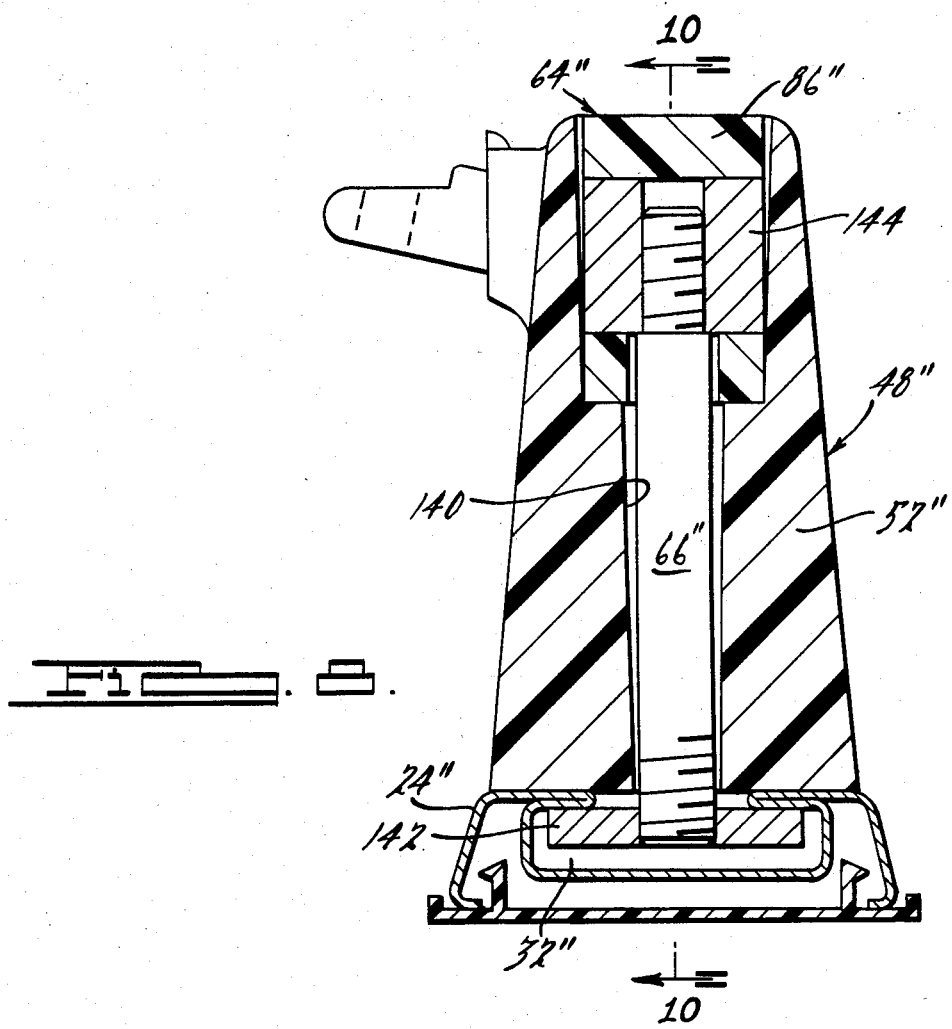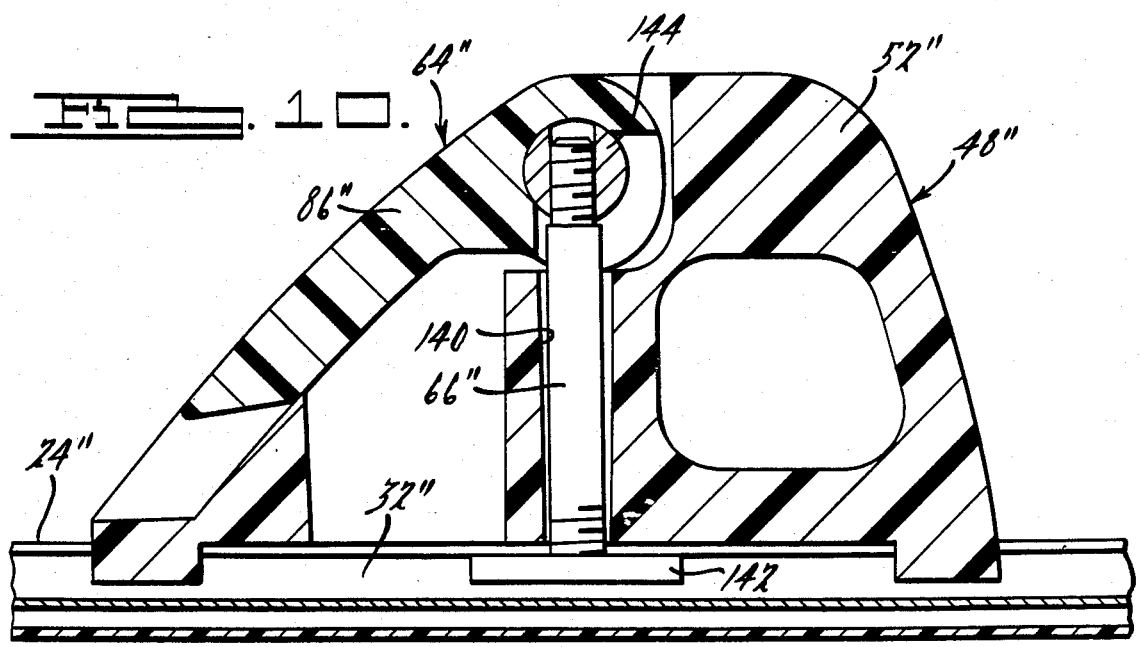

ARTICLE CARRIER WITH ADJUSTABLY POSITIONABLE BRACKET

BACKGROUND

The present invention relates to article carriers and more particularly to multiple rail article carriers and to adjustably positionable brackets therefor.

Luggage racks, ski racks, bicycle carriers and similar carriers for mounting to the exterior sheet metal of motor vehicles are well known and have been disclosed in various forms. Many comprise two or more longitudinal parallel slat assemblies fastened to the trunk or to the roof or to a similar flat exterior sheet metal surface of a motor vehicle. Two or more transverse rails are supported above the sheet metal surface by brackets mounted to the slat assemblies. Some article carriers have brackets allowing adjustability of the spacing between transverse rails. Examples of such article carriers include those disclosed in U.S. Pat. Nos. 3,253,755; 3,554,416; 4,099,658; 4,106,680; and 4,132,335. While such devices may function satisfactorily, some involve a substantial number of components and are subject to a considerable amount of wear, particularly where threaded members are used to lock the brackets in position.

The environment in which article carriers are used is far from ideal. They are subject to vibrations, to moisture, and to a wide range of temperatures. Furthermore, they must endure road dirt and atmospheric contaminants.

It is an object of the present invention to provide an article carrier having an adjustably positionable bracket comprised of few parts. It is another object of the present invention to provide an adjustably positionable bracket for an article carrier in which the bracket is not susceptible to vibrating loose or becoming loose after repeated cycles of locking and unlocking. It is a further object of the present invention to provide an adjustably positionable bracket for an article carrier that permits rapid removal of the brackets and the transverse rails when the article carrier is not in use. A still further object of the present invention is to provide an adjustably positionable bracket for an article carrier in which the bracket may be reliably locked in position with a minimum amount of effort by the operator.

SUMMARY

The present invention provides an article carrier for mounting on an exterior surface of a motor vehicle. The article carrier has two slats or slat assemblies fixedly secured to the surface in a parallel, spaced apart relationship. Each slat assembly extends longitudinally along the surface. Each of the slat assemblies has rib means defining a track. At least one bracket is removably and slidably fastened to the rib means of each slat assembly. Preferably two brackets are provided for each slat assembly. Locking means are provided for securing the bracket in position along the slat assembly by clamping the rib means between the bracket and the locking means. At least two transverse rails are provided. Each rail is fastened at one end to one of the brackets on one of the tracks and is fastened at its other end to one of the brackets on the other of the tracks.

Preferably, each slat assembly has a longitudinal horizontal base, a pair of longitudinal vertical webs extending upwardly from the base, and a pair of inwardly oriented coplanar horizontal ribs, one rib extending from each of the webs to form an upwardly oriented C-shaped track. Preferably, the locking means comprises a clamping plate disposed within the track and a pin fastened to the clamping plate and extending upwardly through a cavity in the bracket. A toggle arm is pivotally fastened to the uppermost end of the pin. The toggle arm selectively draws the clamping plate upwardly against the ribs by means of a camming action between the toggle arm and the bracket or, alternatively, by means of a camming action between the toggle arm and the pin.

BRIEF DESCRIPTION OF THE DRAWING

FIG. 3 is a vertical sectional view taken through the bracket and the slat assembly of FIG. 2 with a portion of the transverse rail cutaway;

FIG. 5 is a cross-sectional view taken along line 5—5 of FIG. 3 showing the toggle arm of the bracket in an unlocked, movement permitting position;

FIG. 6 is a view similar to FIG. 5 showing the toggle arm of the bracket in a locked, movement preventing position;

FIG. 7 is a partial cross-sectional view similar to FIGS. 5 and 6 showing the toggle arm of the bracket in a position intermediate the unlocked and the locked positions;

FIGS. 8, 9 and 10 are views similar to FIGS. 3, 5 and 6, respectively, but depicting an alternate bracket structure according to the present invention;

DETAILED DESCRIPTION OF THE PREFERRED EMBODIMENT

Figure 1:
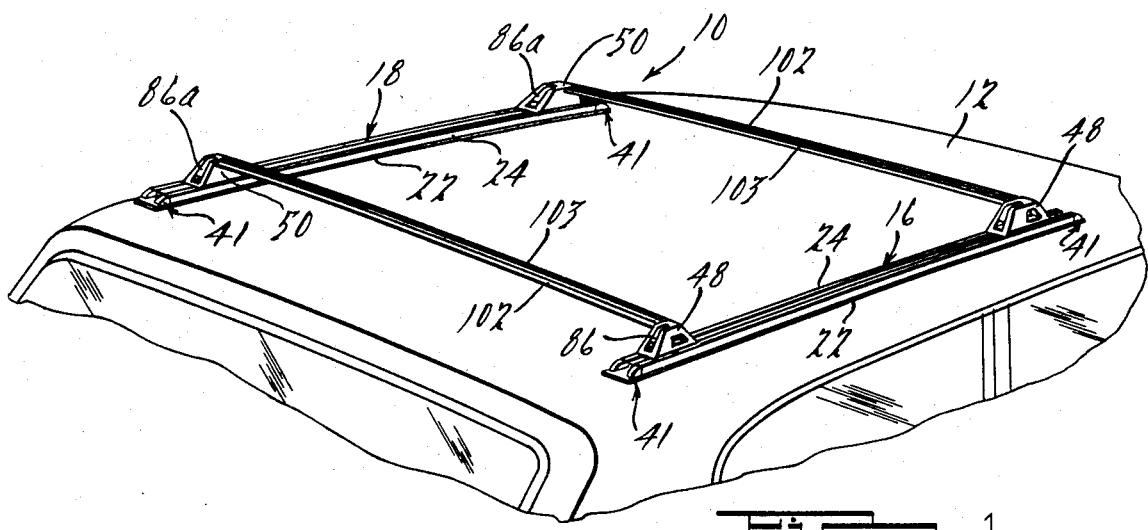
FIG. 1 is a perspective view of the preferred embodiment of the article carrier affixed to the roof of a motor vehicle.
Figure 2:
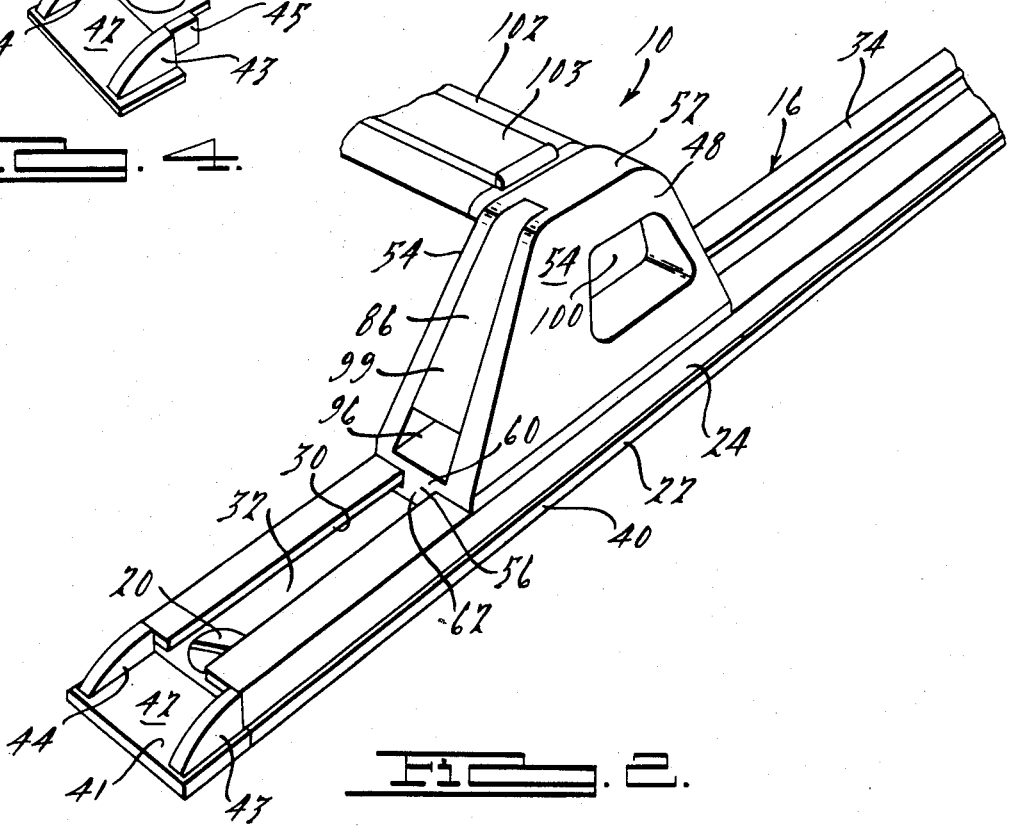
FIG. 2 is an enlarged view of a portion of the article carrier of FIG. 1 showing a portion of one slat assembly, one bracket and a portion of one rail.
Figure 11:
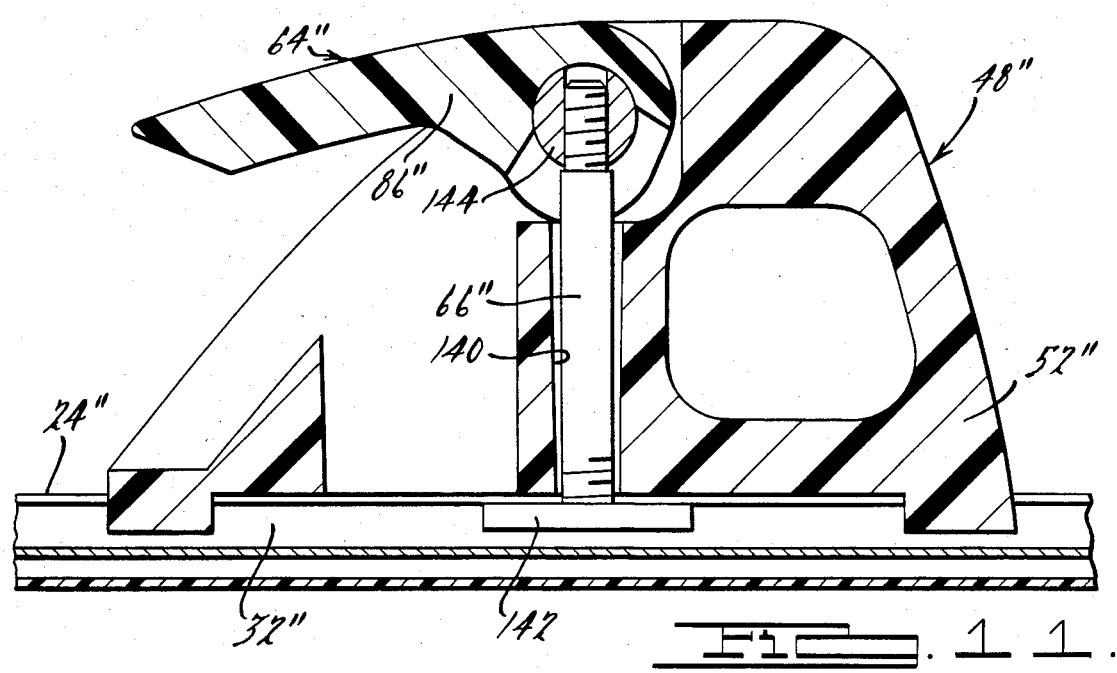
FIG. 11 is a view similar to FIGS. 9 and 10 but showing the toggle arm of the bracket in a position intermediate the unlocked and locked positions.
Figure 9:
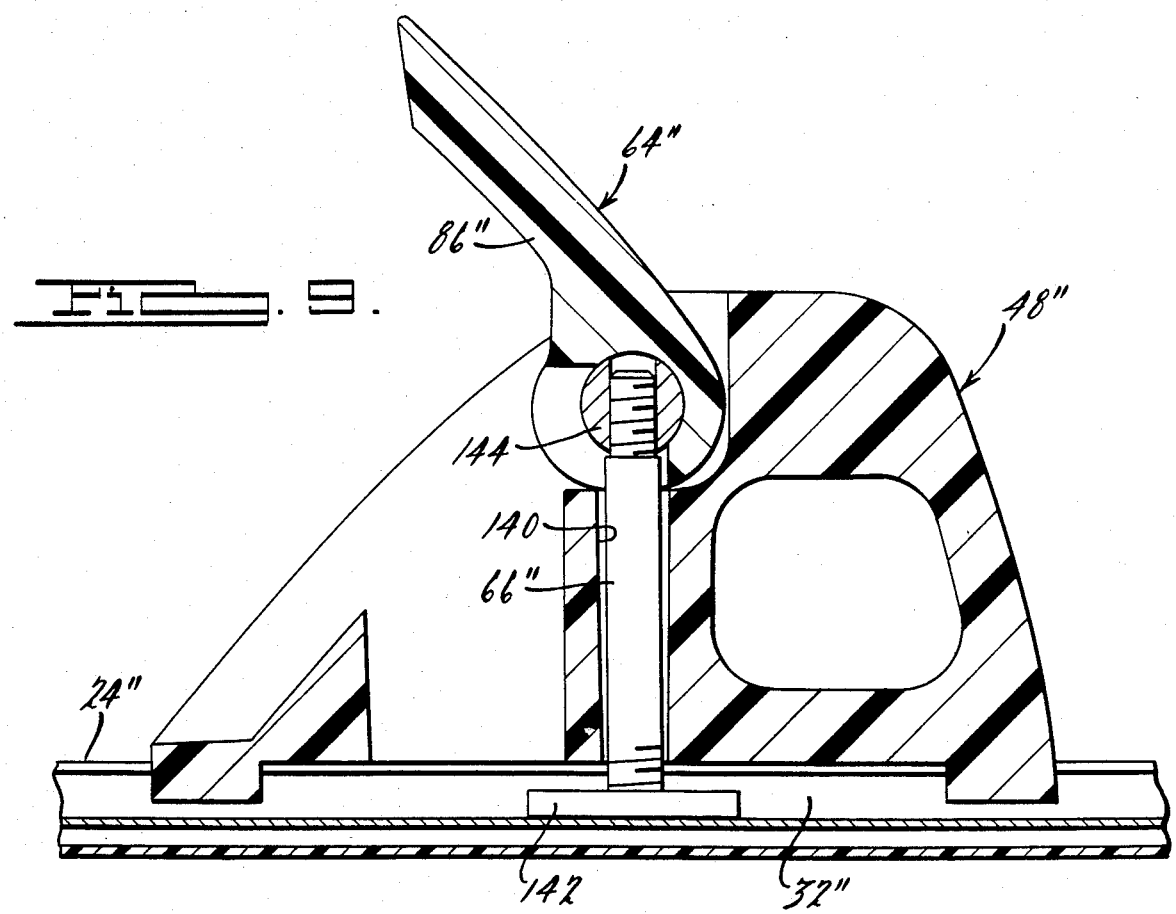

FIGS. 1 and 2 of the drawing illustrate an example of an article carrier 10 according to the present invention. The article carrier 10 is mounted on an exterior sheet metal surface of the motor vehicle 12. In the illustrations, it is shown mounted on the roof 14 of the motor vehicle 12. The article carrier 10 has two slat assemblies 16 and 18. The slat assemblies 16 and 18 are arranged in a parallel, laterally spaced apart relationship and extend longitudinally along the roof 14. The slat assemblies 16 and 18 are fastened to the roof 14 for example by screws 20, shown in the drawing in FIG. 2.

FIG. 3 shows one of the slat assemblies 16 in cross-section. While the following detailed description is of one of that slat assemblies 16, it is understood that the other slat assembly 18 is identical to it. As best seen in FIG. 3, the slat assembly 16 has a substantially flat lower member or runner 22 and an upper member or track 24. The runner 22 preferably is comprised of an extruded plastic for protection of the painted surface of the roof 14.

The track 24 is preferably one piece and is preferably a single sheet metal stamping of roll formed steel. The track 24 has a horizontal longitudinally extending central portion or base 26 resting upon the runner 22. Two inner webs 28 extend upwardly from the base 26. One of a pair of coplanar longitudinally extending horizontal ribs 30 extend inwardly from the upper ends of each of the inner webs 28. A longitudinal slideway cavity 32 partly surrounded by the base 26, the webs 28, and the ribs 30 is thereby formed in the track 24. A portion 34 of the sheet metal of the track 24 is bent back over itself at each of the ribs 30 and extends horizontally outwardly from the slideway cavity 32. An outer web 36 extends downwardly from each portion 34. A pair of gaps 37 are provided between the inner webs 28 and the outer webs 36.

A lip 38 is formed at each of the edges of the sheet metal of the track 24 at the lower end of each outer web 36. Each lip 38 extends inwardly toward the center of the track and cooperates with a pair of upwardly extending longitudinal flanges 39 and 40 of the runner 22 to loosely attach the members 22 and 24 together. The screws 20, as shown in FIG. 2, secure the track 24 to the runner 22 and secure the slat assembly 16 to the roof 14.

Figure 4:
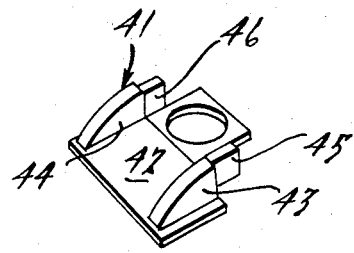
FIG. 4 is a perspective view of an end cap for the slat assembly of FIGS. 2 and 3.

As best seen in FIG. 1, four identical end caps 41 are provided, one being inserted in each end of each of the slat assemblies 16 and 18. One representative end cap 41 is illustrated in FIG. 4. The end caps 41 reduce wind noise when the vehicle 12 is in motion. The end caps 41 have some aesthetic value as well. Each end cap 41 consists of a molded plastic unit having a rectangular base portion 42 of substantially the same thickness as the combined thickness of the slat assembly runner 22 and the sheet metal of the track 24. A pair of curved wedge-shaped side members 43 and 44 extend upwardly from the rectangular base portion 42. The end cap 41 is affixed to the slat assembly 16 by means of a pair of flat snap tabs 45 and 46. Each snap tab 45 and 46 extends from one of the side members 43 and 44. Each snap tab 45 and 46 extends from one of the side members 43 and 44. Each snap tab 45 and 46 is inserted into one of the gaps 37, FIG. 3, between the inner webs 28 and outer webs 36 of the track 24. The end cap 41 is thus secured to the track 24 by the screw 20, shown in FIGS. 1 and 2. The end cap 41 closes the gaps 37 between the webs but does not close the end of the slideway cavity 32 of the track 24, as is best seen in FIG. 2.

Returning to FIG. 1, two identical brackets 48 are slidably positioned along the track 24 of the slat assembly 16. A second pair of brackets 50 are slidably positioned along the track 24 of the slat assembly 18.

FIGS. 3, 5, 6 and 7 illustrate an example of structure of one of the two brackets 48 according to the present invention. The bracket 48 comprises a main body 52 generally disposed above and resting on the track 24. The main body 52 is preferably a unitary plastic molding having a plurality of cavities described hereafter. Alternatively, the main body 52 may be metallic die casting. The specific exterior geometric shape and the contours of the sides 54 main body 52 are matters of design preference and are only of ornamental significance.

Two small tabs 56 extend downwardly from the base 58 of the main body 52 into the slideway cavity 32 to keep the bracket 48 aligned with the track 24. Each tab 56 has a neck portion 60, as best shown in FIG. 3, disposed between the ribs 30 of the track 24. Together, the two neck portions 60 prevent the bracket 48 from being pivoted about an axis perpendicular to the track 24. Each tab 56 preferably also has an enlarged portion 62 dependent from neck portion 60 and located within the slideway cavity 32. The portion 62 prevents removal of the bracket 48 from the track 24 except at the ends of the track.

The main body 52 is slidable along the track 24. A selectively operable clamping assembly 64 is provided to secure the bracket main body 52 in place once it has been moved into the desired position along the track 24. The clamping assembly 64 comprises a pin 66 disposed within a vertical cavity 68 through the main body 52. The cavity 68 is substantially V-shaped in longitudinal cross-section as shown in FIGS. 5 and 6 and is rectangular in transverse cross-section as shown in FIG. 3. The cavity 68 terminates in a circular opening 70 at the base 58 of the main body 52. The pin 66 extends downwardly from above and through the cavity 68, through the opening 70, and into the slideway cavity 32 of the track 24. The pin 66 swings within the cavity 68 about the opening 70 and reciprocates vertically through the opening 70.

A clamping plate 72 disposed within the longitudinal slideway cavity 32 of the track 24 is mounted to the end of the pin 66. The clamping plate 72 illustrated is a rectangular stamping made from spring sheet metal, preferably spring steel. The clamping plate 72 may be secured to the end of the pin 66 by means, for example, clip 74 which is stamped into the clamping plate.

A cylindrically shaped enlargement 76 is provided at the uppermost end of pin 66. The enlargement 76 comprises a short cylindrical member having its longitudinal axis disposed perpendicular to the longitudinal axis of the pin 66. The enlargement 76 and the pin 66 illustrated are formed from a single piece of metal or may be molded as a single piece of plastic. Preferably the pin 66 is made of stainless steel.

A second and more shallow cavity 80 is provided in the main body 52 above the cavity 68 and in communication with the cavity 68. The cavity 80 is wider in transverse cross-section than cavity 68, thus providing a shoulder 82 on the floor of the cavity 80 on either side of the opening for the cavity 68. A lever or toggle arm 86 mounted to the enlargement 76 of the pin 66 is partially disposed within the cavity 80. An open ended slot 90, FIGS. 6 and 7, is provided in the toggle arm 86 for passage of the enlargement 76 therealong. A second open ended slot 92, as shown in FIG. 3, is provided for the passage of the pin 66 therealong. The lower side of the toggle arm 86 is provided with an extension 93 defining a camming surface 94 resting on the shoulder 82 in the cavity 80.

In operation, the toggle arm 86 is manually movable to pivot about the enlargement 76 between the extreme positions shown in FIG. 5 and in FIG. 6. Due to the camming action of the camming surface 94 of the extension 93, when the toggle arm 86 is pivoted counter-clockwise from the position shown in FIG. 5 to the position shown in FIG. 7, the pin swings slightly and then is urged upwardly. As shown in FIG. 6, the clamping plate 72 is raised and pressed against the rib 30 of the track 24, prohibiting movement of the bracket 48 along the track 24.

The clamping plate 72 is flexible and acts as a spring in response to the tension exerted on the pin 66 by the toggle arm 86. The amount of force exerted by the clamping plate 72 on the track 24 increases with the upward displacement of the pin 66. The extension 93 is designed so that the greatest displacement of the pin 66 and thus largest tension forces exerted on the pin occur at the intermediate position of the toggle arm 86 depicted in FIG. 7, thus providing a "cam over center"

locking effect. A small but definite exertion is required to move the toggle arm 86 from the extreme locked position of FIG. 6 to the extreme unlocked position of FIG. 5. The force required to raise the toggle member from the position shown in FIG. 6 to that shown in FIG. 7 is sufficient to prevent accidental disengagement of the clamping plate 72 and the ribs 30. Sufficient locking force is, however, provided in the position shown in FIG. 6 to prevent movement of the bracket 48 along the track 24.

It should be noted that the flexible clamping plate 72 has additional advantages. Use of a flexible clamping plate 72 reduces the wear on the other components, particularly the main body 52 and the extension 94 of the toggle arm 86. Furthermore, the use of a flexible clamping plate decreases the chance that the clamp will be loosened due to vibrations during vehicle operation.

A third cavity 96 adjacent to cavity 80 is provided in the surface of the bracket 48. The cavity 96 provides a location in which the toggle arm 86 is located in the locked position shown in FIG. 6. This allows the toggle arm 86 to be flush with the sides 54 of the main body 52 in the locked position for aesthetic and wind noise reduction purposes. The toggle arm 86 does not, however, entirely fill the cavity 96. Thus, access is provided in the cavity to the end 99 of the toggle arm 86 farthest from the pin 66 for unlatching the clamping assembly 64.

A tie ring aperture 100 is provided transversely through the main body 52 of the bracket 48 for tie ropes or the like to secure loads to the article carrier.

As best shown at FIGS. 1, 2 and 3, a pair of transverse rails 102 are provided. Each rail 102 extends transversely across the longitudinal axis of the vehicle and between the upper portions of oppositely facing brackets 48 and 50. The means fastening the rails 102 to the bracket 48 are not shown in detail in the drawing and will not be described in detail here since many appropriate fastening means are well known in the art.

As previously described, brackets 50 on the slat assembly 18 are preferably identical to the brackets 48 on the slat assembly 16. In the event that identical backets 48 and 50 are used, brackets 50 must be positioned along the slat assembly 18 with the tongues 104 facing inwardly. The end 99 of the toggle arm 86 will therefore be pointed towards the front of the motor vehicle on one set of brackets 48 and towards the rear of the motor vehicle on the other set of brackets 50. This design is to keep to a minimum the number of different component parts that must be manufactured and maintained in inventory. Alternatively, and as illustrated in FIG. 1, the brackets 50 differ from the brackets 48. As shown, the brackets 50 have the toggle arm 86a mounted oppositely to the orientation of the toggle arm 86 on the bracket 48. Thus, as shown, the ends 99 of the toggle arms 86 and 86a are both oriented in the same direction, in this case, towards the rear of the motor vehicle 12. This design is preferable if it is desired to obtain an ornamental symmetry to the article carrier 10. Furthermore, less wind noise is created if the toggle arm faces the rear of the vehicle.

FIGS. 8 through 11 illustrate still another example of structure for a bracket 48' according to the present invention. The bracket 48' has a main body 52' similar to the main body 52 described above. A clamping assembly 64' includes a pin 66' disposed within a vertical bore 140 with the lowermost end of the pin inserted into the slideway cavity 32' of the track 24'. A clamping plate 142 is mounted to the end of the pin 66'. A horizontally disposed cylindrical member 144 is fastened to the opposite end of the pin 66'.

A toggle arm 86' is pivotally fastened to the cylindrical member 144 to pivot between the extreme positions illustrated in FIGS. 12 and 13. As with the clamping assembly 64 described previously, the maximum tension force exerted by the toggle arm upon the pin at a position of the toggle arm (shown in FIG. 14) that is between the extreme positions.

As is readily apparent from the above description, the present article carrier has a small number of components that may be rapidly and easily assembled and attached to motor vehicles. The brackets are not easily vibrated loose. The toggle arm 86 and 86', the clamping plate 72, the pin 66, and the main body 52 of the brackets 48 and 48' and 50 are each protected against direct exposure to the environment at critical locations. The rails may be moved closer together or farther apart depending on the size of the article carried and then may be rapidly and reliably secured in position. Additional rails may be added as needed. Furthermore, when the article carrier is not in use, the rails and the bracket may be easily removed from the motor vehicle to prevent damage or theft and to reduce the wind noise associated with some article carriers when they are not carrying cargo.

The above constitutes a detailed description of the preferred embodiment of the present invention and is intended by way of example and not by way of limitation. Obvious modifications may be made within the scope of the appended claims without departing from the spirit thereof.

What is claimed as novel is as follows:

1. An article carrier for mounting on a surface of a motor vehicle, said article carrier comprising two tracks fixedly secured to said surface in a spaced apart parallel relationship, a longitudinal rib extending from each track, two brackets slidably secured to each of said tracks, two rails, each of said rails extending transversely between one of said brackets on one of said tracks and one of said brackets on the other of said tracks, said rails being fastened to said brackets such as to be supported above said surface, a resilient clamping plate disposed adjacent to said rib, a pin fastened to said plate, said pin having at its end furthest from said clamping plate a cylindrical member joined at right angles to said pin, a toggle arm having a linear passageway to pivotally mount said cylindrical member, and said pin passing through said toggle arm from said cylindrical member to said clamping plate, said toggle arm having a camming extension on a surface thereof in contact with the surface of said bracket whereby as said toggle arm is pivoted, said camming extension causes said toggle arm to draw said pin and urge said plate against said rib thereby clamping said rib between said plate and said bracket to fixedly secure said bracket to said rib.

2. The article carrier of claim 1 further comprising aligning means inhibiting rotation of said bracket about any axis perpendicular to the longitudinal axis of said slat.

3. The article carrier of claim 1 wherein each of said tracks comprises a horizontal base, two substantially vertical longitudinal webs and a pair of substantially horizontal inwardly facing ribs such that said base, said webs, and said ribs together form an upwardly oriented C-shaped slideway having an inside and outside, said bracket being adjacent to both of said ribs outside of said slideway and further wherein said clamping means comprises a plate disposed inside said slideway whereby when said toggle arm is selectively operated said clamping plate simultaneously clamps both of said ribs.

4. The article carrier of claim 1 wherein said toggle arm exerts a maximum amount of tension force on said pin at an intermediate position of said toggle arm such that an exertion of force is required to move said toggle arm from either of the two extreme positions of its travel.

5. The article carrier of claim 1 further comprising aligning means fastened to each of said brackets inhibiting rotation of said bracket about any axis perpendicular to the longitudinal axis of said slat.

6. The article carrier of claim 1 further comprising a cavity in said bracket and wherein said toggle is disposed partly outside of said cavity in said one extreme position and is disposed totally within a cavity in said bracket in said other extreme positions.

7. The article carrier of claim 1 further comprising a tie ring aperture in each said bracket.

8. An article carrier as defined in claim 1 wherein said pin has a threaded upper end threadably and adjustably connected to said cylindrical member for adjusting the distance of said clamping plate from said cylindrical member.

* * * * *